United States Patent [19]

Urko

[11] Patent Number: 5,774,513
[45] Date of Patent: Jun. 30, 1998

[54] HEAD AREA CABLE TRAY BRIDGE

[75] Inventor: William Urko, West Granby, Conn.

[73] Assignee: Combustion Engineering, Inc., Windsor, Conn.

[21] Appl. No.: 783,240

[22] Filed: Jan. 14, 1997

[51] Int. Cl.[6] .................................................. G21C 19/00
[52] U.S. Cl. ............................. 376/263; 376/260; 248/49
[58] Field of Search .................................. 376/203, 260, 376/262, 263, 463; 248/49, 56, 68.1; 439/446; 385/135; 254/134.3 R, 389

[56] References Cited

U.S. PATENT DOCUMENTS

| | | | |
|---|---|---|---|
| 3,836,429 | 9/1974 | Frisch et al. | 376/263 |
| 3,836,430 | 9/1974 | Frisch et al. | 376/263 |
| 4,158,599 | 6/1979 | Andrews et al. | 376/263 |
| 4,302,290 | 11/1981 | Mazur et al. | 376/260 |
| 4,654,188 | 3/1987 | Hankinson | 376/287 |
| 4,830,814 | 5/1989 | Altman | 376/263 |
| 4,857,265 | 8/1989 | Pol et al. | 376/263 |
| 4,961,899 | 10/1990 | Altman et al. | 376/260 |
| 5,201,112 | 4/1993 | Sevelinge | 376/263 |
| 5,384,812 | 1/1995 | Meuschke et al. | 376/263 |
| 5,465,278 | 11/1995 | Cowan, II et al. | 376/249 |

FOREIGN PATENT DOCUMENTS

WO9525330  9/1995  WIPO.

*Primary Examiner*—Daniel D. Wasil
*Attorney, Agent, or Firm*—Ronald P. Kananen; John H. Mulholland

[57] ABSTRACT

In order to facilitate refueling operations, cables, which provide control and power linkages between control element drive mechanisms (CEDMS), and a terminal panel supported on a side wall of the reactor cavity, are disposed in a cylindrical extension of a cylindrical enclosure which encloses the CEDMS, with sufficient slack that they can be drawn out of the cylindrical extension through windows and supported on a drawbridge type of arrangement comprised of pivotal window tray type structures which are respectively hingedly connected to the cylindrical extension and either the wall or the terminal panel, and which span the gap between the cylindrical extension and the terminal panel when pivoted to their respective supporting positions.

8 Claims, 5 Drawing Sheets

HEAD AREA CABLE TRAY BRIDGE

BACKGROUND OF THE INVENTION

1. Field of the Invention

The present invention relates generally to a nuclear reactor. More specifically, the present invention relates to an arrangement which houses cables which provide connections with control element drive mechanisms (CEDM) and like types of apparatus which are arranged above the head of a nuclear reactor, and facilitates cable connection/disconnection during refueling.

2. Description of the Related Art

In order to refuel a pressurized water reactor, it is necessary to remove various pieces of equipment which are located directly over the reactor vessel and the reactor vessel closure head before removing the upper reactor internal structures, such as an upper guide structure. In currently proposed designs, this removal of equipment requires multiple lifts of various structures. The missile shield, control element drive mechanism cables, other cables attached to the head area, the supporting structure for the cables, ductwork for directing airflow to cool the control element drive mechanisms (CEDMS), and thermal insulation on the reactor vessel flange, must be all removed before the reactor vessel closure head itself can be removed.

Other important considerations in the design of the head area are that the structure must provide separation of safety related cables into channels and separation of the safety related cables from the non-safety related cables to prevent damage to multiple channels due to fire or electrical short circuits. Access must be provided to maintain head area equipment such as venting of the control element drive mechanisms and replacement of the control element drive mechanism components during maintenance. The structures and components must function during seismic events and other accident conditions to allow the plant to be safely shut down.

A head equipment support structure disclosed in U.S. Pat. No. 4,302,290 to Mazur et al. issued on Nov. 24, 1981, combines a missile shield, control element drive mechanisms (CEDMS) and other head area cables as well as the cable supports into a single lift. However, this type of arrangement has several disadvantages. The so called "organic" cables which are currently used to connect the control element drive mechanisms with fixedly supported termination panels in such arrangements, have large outer diameters and a substantial bending radii. This results in a very large cable support structure that is required to support these heavy cables. Further, the time required to remove and re-assemble this structure during the refueling process is lengthy, because the cables must be disconnected at both the termination panels and at the control element drive mechanisms and that two lifts are necessary to remove the structure and the reactor vessel head. One lift is needed to remove the Head Area Cable Tray System (HACTS) and the second lift to remove the head lift rig.

One approach to solving this problem is disclosed in U.S. Pat. No. 4,158,599 issued on Jun. 19, 1979 in the name of Andrews et al. In this arrangement, the cables are not disconnected and instead, a pivotal cable tray is arranged so that when an upper package, including the pressure vessel head, is lifted using an overhead crane arrangement, the whole cable tray pivots and tilts facilitating movement of the package. This arrangement however, limits the amount of freedom with which the upper package can be moved and the positions in which the upper package can disposed during refueling. The pivotal cable tray also requires that adequate space be provided to enable engagement-free tilting.

Another approach to dealing with the cables is disclosed in U.S. Pat. No. 5,384,812 to Meuschke et al. issued on Jan. 24, 1995 wherein the cables are arranged with a pivotal frame which is mounted on a guide mechanism such as a vertical guide track. This arrangement allows the frame to be moved vertically with respect to the cavity in which the reactor vessel is disposed, and then swung over the upper edge of the cavity to a position wherein the cables can be connected to the appropriate devices/interfaces. However, there are many facilities wherein such space is not available and/or cannot be provided for such a cable transport arrangement.

SUMMARY OF THE INVENTION

An object of the invention is, therefore, to provide a cable connection arrangement which facilitates the connection and disconnection of cables during refueling and which is both compact, easy to work with and which does not require the provision of large scale/complex specialized equipment in and around the reactor cavity.

Another object of the present invention is to provide a structure which takes the form of a cylindrical enclosure, the upper portion of which is provided with windows through which cables, which are housed within the structure, can be drawn and connected to a terminal panel which is supported on a wall of the reactor cavity.

It is still a further object of the present invention to provide a cable supporting "drawbridge" type of structure wherein one half of the drawbridge arrangement is pivotally supported on the cylindrical enclosure while the other half is pivotally supported on the terminal panel or the wall to which the panel is fixed.

In brief, these and other objects of the invention are basically achieved by an arrangement wherein, in order to facilitate refueling operations, cables, which provide control and power linkages between control element drive mechanisms (CEDMS), and a terminal panel supported on a side wall of the reactor cavity, are disposed in a cylindrical extension of a cylindrical enclosure, which encloses the CEDMS, with sufficient slack that they can be drawn out of the cylindrical extension through windows, and supported on a drawbridge type of arrangement comprised of pivotal window tray type structures that are respectively hingedly connected to the cylindrical extension and either wall or the terminal panel, and which span the gap between the cylindrical extension and the terminal panel when pivoted to their respective supporting positions.

The ends of the cables are provided with connectors which engage limits provided on the free edges of the window trays. With this arrangement, the maximum retractile movement of the cables into the interior of the cylindrical extension is limited and places the ends of the cables within easy reach when the drawbridge arrangement is lowered and cable re-connection is initiated.

The shape and dimensions of the cylindrical enclosure and the extension, in which the cables are housed during periods of disconnection, are so sized that a sufficient space is provided to allow, when the drawbridge arrangement is in a fully retracted state, a multiple stud tensioner to be lowered without interference to a position wherein the studs, which hold the pressure vessel head in place, can be engaged and unscrewed in a manner which will allow the release of the pressure vessel head.

More specifically, a first aspect of the present invention resides in a cable support arrangement for a nuclear reactor system comprising: a terminal panel supported on a wall of a cavity in which a pressure vessel of the nuclear reactor system is disposed; a cylindrical housing disposed above the pressure vessel; a first cable support tray pivotally mounted on the terminal panel, the first cable support tray being pivotal between an open position wherein it extends toward the pressure vessel and spans a distance between the terminal panel and the cylindrical housing, and a closed folded position; a second cable support tray pivotally mounted on the cylindrical housing, the second cable support tray being pivotal between an open position wherein it extends toward the second tray so as to span the distance between the terminal panel and the cylindrical housing, and a closed folded position wherein it lies essentially flush with the side of the cylindrical housing; and a plurality of cables which are housed within the cylindrical housing, the cables being arranged to remain connected at their respective first ends to predetermined devices which are associated with the pressure vessel and which are at least in part surrounded by the cylindrical housing, the cables being arranged to be drawn out of the cylindrical housing and extend across the first and second trays, which acts as a support arrangement which spans the gap between the housing and the terminal panel, and to be releasably connected to the terminal panel.

An important feature of the above arrangement is that the second cable support tray has limit means at its free edge for engaging the respective second ends of the plurality of cables when they are disconnected from the terminal panel and for holding the second ends in a position proximate a free edge of the second cable support tray to limit the maximum retractile movement of the cables into the interior of the cylindrical housing.

Another aspect of the invention resides in a method of refueling a nuclear reactor having a pressure vessel disposed in a reactor cavity, the pressure vessel having a pressure vessel head, comprising the steps of: disconnecting cables from a terminal panel which is supported on a wall of the reactor cavity in which a nuclear reactor is disposed; withdrawing the cables which are supported on first and second pivotal support members that are respectively pivotally supported on the terminal panel and an essentially cylindrically-shaped housing, and which extend toward each other into the housing; pivoting the first and second pivotal support members into folded positions wherein they lie essentially flush with the terminal panel and the housing respectively and wherein they open a gap between the terminal panel and the housing; lowering a device through the gap to a head of the nuclear reactor and releasing the pressure vessel head from the pressure vessel; and lifting the pressure vessel head and the housing which are rigidly connected as a single unit, using a lifting device out of the cavity to expose an interior of the pressure vessel.

A third aspect of the invention resides in a method of connecting cables between a terminal panel and a housing comprising the steps of: storing a plurality of cables in an essentially cylindrically-shaped enclosure; pivoting a first cable support structure which is pivotally supported on a terminal panel disposed on a wall of cavity in which a nuclear reactor pressure vessel is disposed, from a first closed position to a second open position wherein it projects toward the cylindrically-shaped enclosure; pivoting a second cable support structure which is pivotally supported on a cylindrical enclosure structure from a first closed position to a second open position wherein it extends toward the terminal panel and wherein it opens into an opening formed in the cylindrical enclosure; drawing a plurality of cables which are housed in the housing and are connected at their respective first ends to predetermined devices, out of the opening and across the first and second cable support structures and connecting the ends of the cables to the terminal panel.

A fourth aspect of the present invention resides in a drawbridge arrangement comprising: a first pivotal support member hingedly supported on a housing in which a predetermined length of cable is disposed; a second pivotal support member hingedly supported on a terminal panel which is supported on a wall portion of a structure in which the housing is disposed; means for guiding the cable over the first and second pivotal support members to the terminal panel; and means for pivoting the first and second pivotal support members to closed positions after the cable has been disconnected from the terminal panel and drawn back into the housing.

A further aspect of the invention resides in a reactor system comprising: means defining a cavity having a wall; a pressure vessel disposed in the cavity, the pressure vessel having a pressure vessel head; control rod means operatively disposed on the pressure vessel head for lowering control rods into the pressure vessel; a lower cylindrical enclosure disposed about the control rod means, the lower cylindrical enclosure being connected to the pressure vessel head in a manner to be rigid therewith; a missile shield disposed in and secured to an upper end of the lower cylindrical enclosure; an upper cylindrical enclosure which is rigidly connected to at least one of the lower cylindrical enclosure and the missile shield; a plurality of cables which are operatively connected at their respective first ends to the plurality of control rod means; a terminal panel supported on a wall of the cavity at a location opposite the upper cylindrical housing; a first pivotal member supported on the upper cylindrical housing adjacent an aperture formed in the upper cylindrical member; and a second pivotal member supported on the terminal panel or on the wall of the cavity, the first and second pivotal members being each pivotal to an open positions wherein they extend toward each other and bridge a gap between the upper cylindrical enclosure and the terminal panel to create a drawbridge-like cable support structure that supports the plurality of cables when they are drawn out of the upper cylindrical enclosure and connected to the terminal panel.

BRIEF DESCRIPTION OF THE DRAWINGS

The various features and advantages of the present invention will become more clearly appreciated as a description of the preferred embodiment is given with reference to the accompanying drawings in which.

DETAILED DESCRIPTION OF THE PREFERRED EMBODIMENTS

The present invention finds particular, but not exclusive, application with the so called "System 80®" PWR arrangement marketed by ABB Combustion Engineering Nuclear Power. Copending U.S. patent application Ser. No. 08/646,402 filed on May 9, 1996 in the name of Matteson, discloses a modification of this type of system.

The following description of the preferred embodiment is given with reference to an arrangement wherein the inventive arrangement is applied to the type of system disclosed in the above mentioned copending application, the description of which is hereby incorporated by reference.

Figure 1:
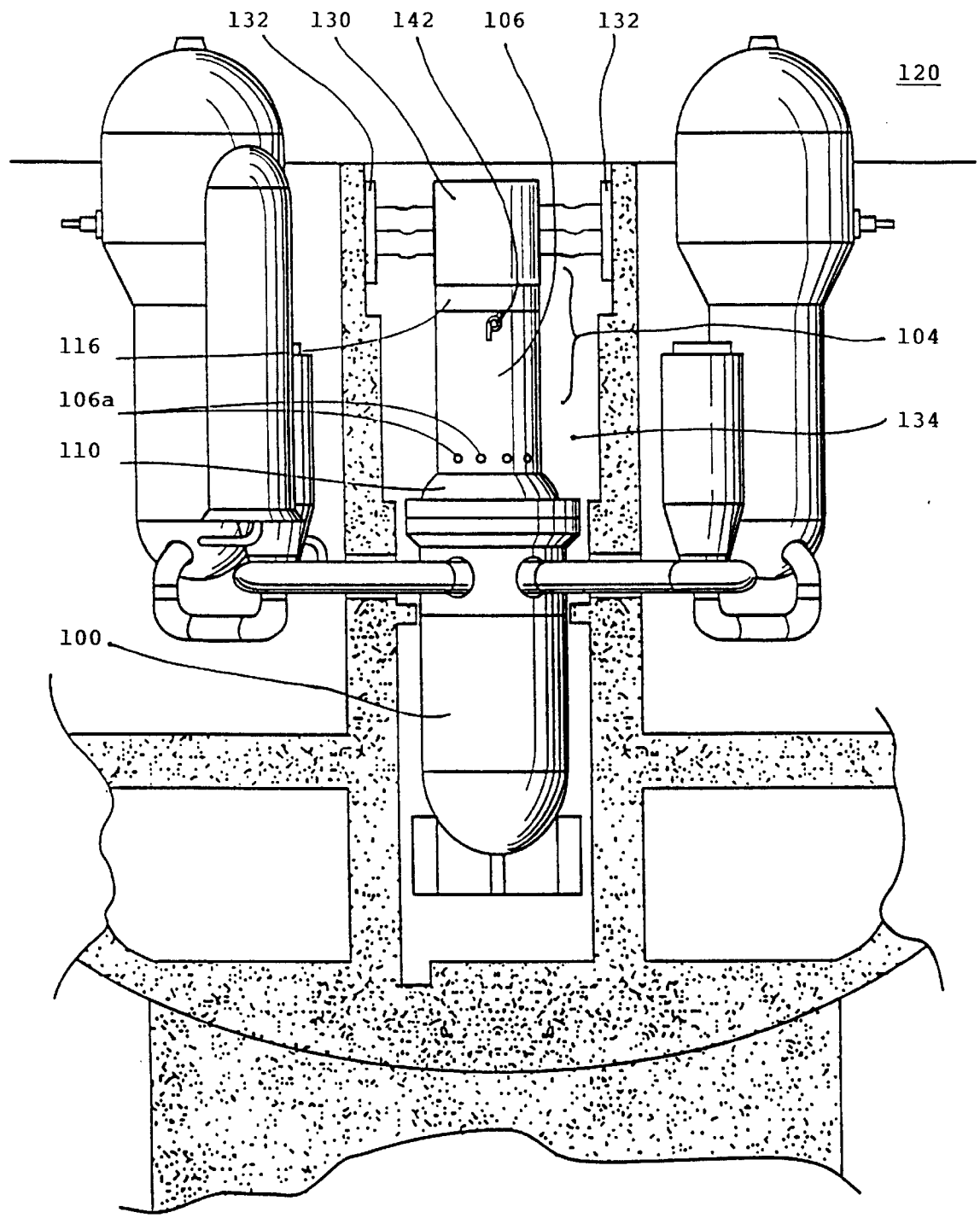
FIG. 1 is a schematic elevation showing an embodiment of the present invention.

FIG. 1 shows a pressure water reactor (PWR) to which the present invention is applied. As shown, the reactor vessel 100 is supported by a containment building 120 in a well known manner. The numeral 104 generally denotes an assembly which characterizes the present invention and which includes a lower cylindrical enclosure 106 that is attached at its lower end to pads 108 (see FIG. 2) on the reactor vessel closure head 110. The top of the lower cylindrical enclosure 106 is located above the top of the control element drive mechanisms 112 and is adapted to have a missile shield 116 and cable supports 118 attached thereto. The missile shield 116 closes the upper end of the lower cylindrical enclosure 106 in a manner similar to a cap on a jar, and is bolted to the flange 114 on the cylindrical enclosure 106. Since the missile shield 116 completely encloses the top of the lower cylindrical enclosure 106, and potential head area missiles are located inside of the lower cylindrical enclosure 106, this arrangement provides an improved capability of preventing damage from missiles as compared to that possible with previous designs.

The missile shield 116 is provided with access openings (not shown) which are located over the control element drive mechanisms 112, which are sized to prevent missiles escaping therethrough, and which enable trapped air to be vented when the reactor coolant system is refilled after a refueling. Removal of the air is critical to minimizing the potential for stress corrosion cracking of the control element drive mechanism nozzles (not shown).

Figure 4:
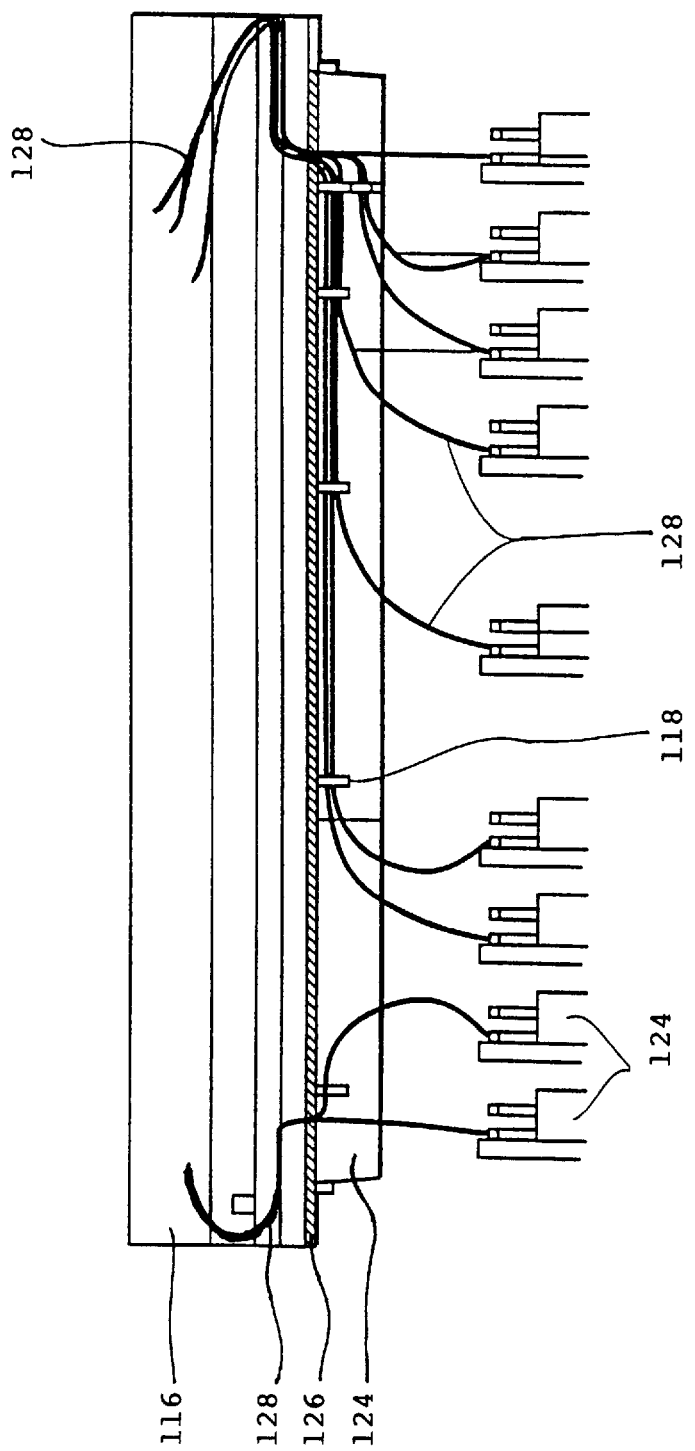
FIG. 4 is a side sectional view showing how the cables, which are connected with the CEDMS are supported on the underside of the missile shield and then extend into the interior of the cylindrical enclosure extension skirt.

The rigidity of the missile shield 116 is increased by integral ribs 124 (FIG. 4) welded to the bottom of a plate 126 which forms a major part of the missile shield and which is securely attached to the lower cylindrical enclosure 106.

Figure 2:
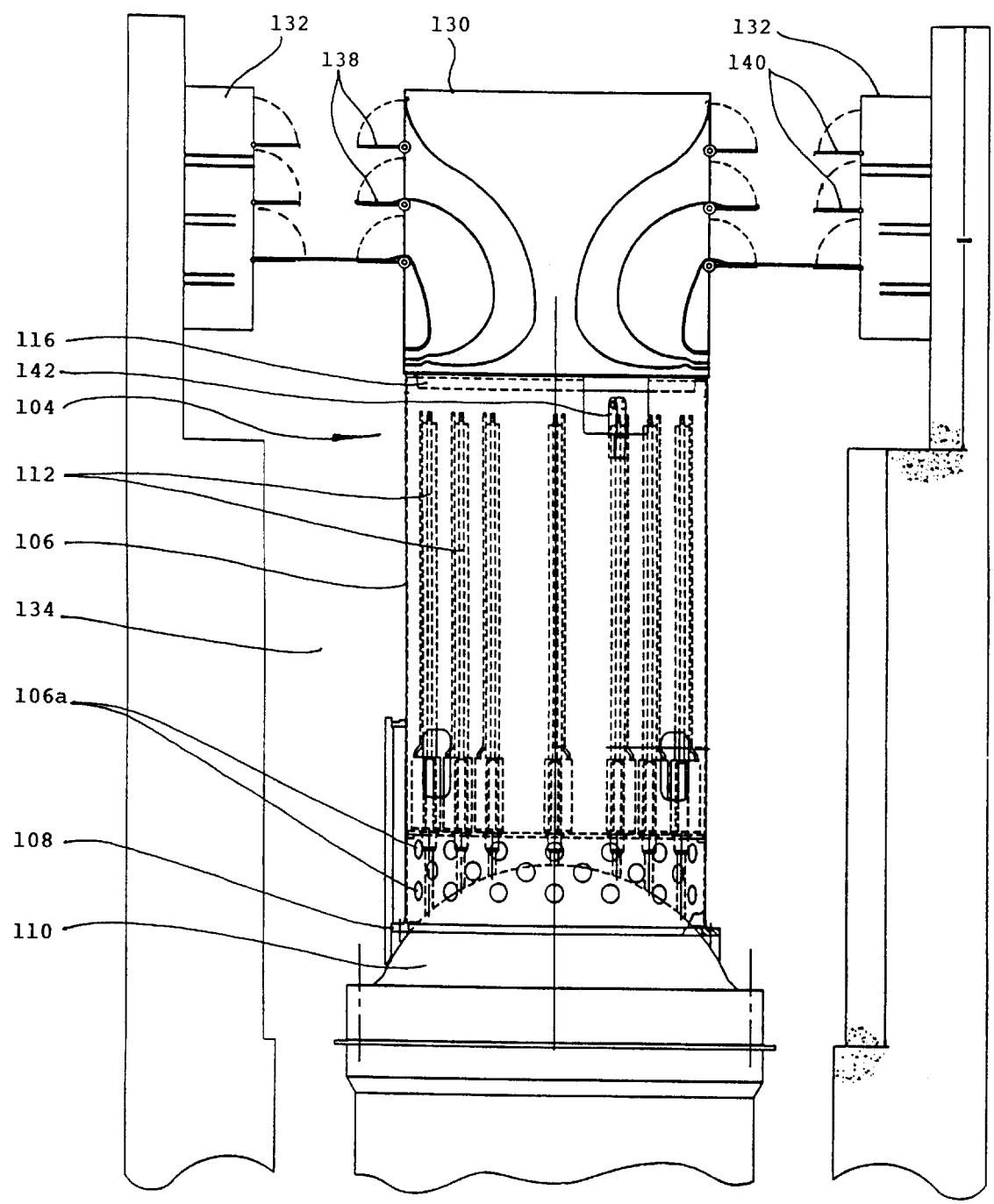
FIG. 2 is a partially sectioned view showing the drawbridge type of arrangement which characterizes the invention.
Figure 3:
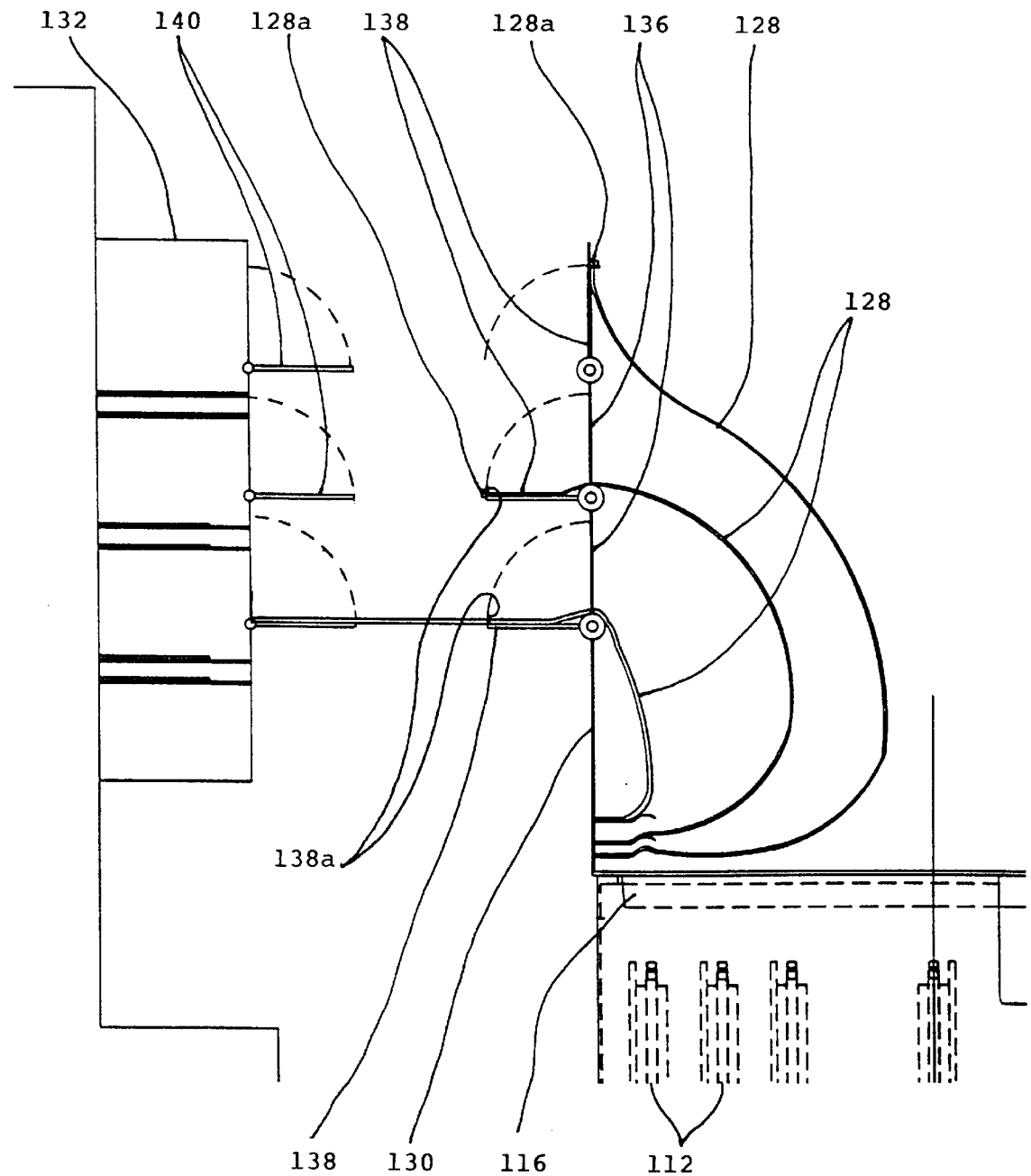
FIG. 3 is an enlarged view of the drawbridge arrangement showing details of how the "window trays" fold down into position and the manner in which cables are associated therewith.

Control element drive mechanism cables 128 consist of two (2) RSPT cables and one (1) power cable, per control element drive mechanism. The RSPT cables are divided into four (4) safety related channels. The power cables are non-safety related. The RSPT cables are routed up to the ribs 124 under the missile shield 116 and are attached to the sides of the ribs 124 for support by the cable supports 118. The cable routing is performed in a manner that uses the ribs 124 to provide the necessary channel separation. The cables 128 are routed through openings in the missile shield 116, and are gathered and then routed up into an upper cylindrical enclosure 130 which is securely bolted to the one or both of the missile shield 116 and the lower cylindrical enclosure 106. As shown in FIGS. 1 to 3, this upper cylindrical enclosure or skirt 130 is arranged to extend up between two opposed terminal panels 132 which are supported on the side of the reactor cavity 134.

The HACTS or head area cable tray system in this embodiment is considered to include the upper and lower cylindrical enclosures 106, 130, the missile shield 116, and the cables 128. As the lower cylindrical enclosure 106 is securely bolted to the pressure vessel head 110, the HACTS and the head become a single unit which may be raised and lowered in a single lift. After the HACTS has been lifted out of the cavity and is placed in a set down area, the upper cylindrical enclosure or skirt 130 can be unbolted and separated from the missile shield 116 and the lower cylindrical housing 106, thus permitting access, via the access openings, to the upper region of the control rod drive mechanisms 112 whereby removal and replacement of the control element drive mechanism reed switch position transmitters (RSPTs) and other commonly serviced components, is facilitated.

In accordance with the present invention, the upper cylindrical enclosure or skirt 130 is formed with apertures or windows 136, and further provided with pivotal covers or window trays (as they will be referred to hereinafter) 138. As shown in FIGS. 2 and 3 these window trays are pivotal about hinges in the manner indicated by the broken lines. The upper ends of the cables 128 are provided with connectors 128a which engage limits 138a provided at the free edges or lips of the window trays 138 in the manner depicted in FIG. 3. This arrangement limits the amount of retraction the cables can undergo and holds the ends of the cables in readily accessible positions when the window trays are opened.

Each of the terminal panels 132 are provided with a plurality of pivotal structures 140 which are essentially the same as the window trays 138. Accordingly, these structures will also be referred to as window trays. As shown in FIGS. 2 and 3 these window trays 140 are each arranged to pivot downward from a closed position to one wherein they are essentially aligned with a tray 138 on the upper cylindrical enclosure or skirt 130. In the open positions each opposed pair of window trays 128, 140, is such as to define an arrangement which resembles a drawbridge.

With this arrangement once each opposing pair of window trays are opened to form the "drawbridges" the cable connectors 128a can be grasped manually (for example) and pulled across to the appropriate terminal panel 132 and connected to the appropriate panel connector.

While, in this instant embodiment it is envisaged that the window trays and cables are to be opened and closed manually, and that suitable simple latches are provide on each window tray to ensure that they stay shut after cable disconnection and subsequent closure, it is of course within the scope of the invention to provide a suitable form of servo or assist device which, in the event that the window trays are sufficiently heavy to present a physical problem, will enable the window trays to be closed either one by one, or as a group, be provided. By way of example only, it is possible to connect suitable chains or cables to the window trays in a manner which allows a single electrically driven winch or the like, to wind in the cables and pull the window trays up to a closed position.

Figure 5:
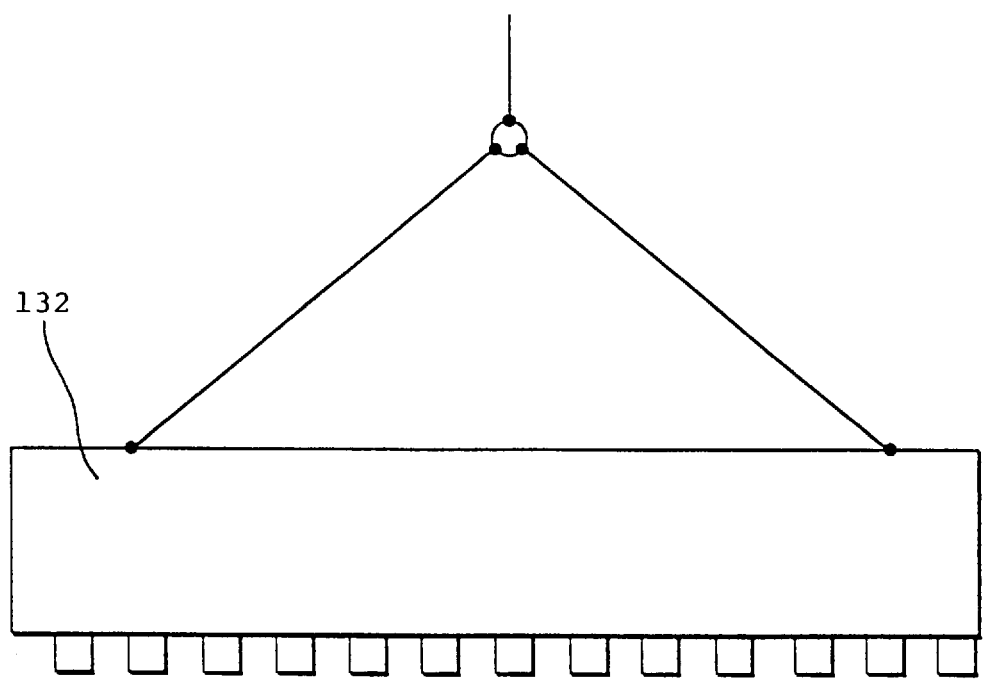
FIG. 5 is a schematic side view showing a multiple stud tensioner which can be lowered down into the reactor cavity and used to remove the studs which are used to secure the reactor head to the top of the reactor vessel.

The radial envelope of the upper and lower cylindrical enclosures 130, 106 is such that, when the window trays 138, 140 are closed, an annular multiple stud tensioner 132 of the nature schematically illustrated in FIG. 5, can be lowered over the cylindrical enclosures 130, 106 to remove the reactor vessel closure head studs. This is an important feature as the multiple stud tensioner 132 significantly reduces the time and radiation exposure required for the removal and/or installation of the head area equipment. An example of this type of device is manufactured by Westfalia Becorit of Germany.

The lower cylindrical enclosure 106 is equipped with attachment points or lifting lugs 142 for an overhead lifting fixture that is used to lift the reactor vessel closure head 110 and the attached equipment (i.e., elements 106, 116, 130 etc.,) and transfer it to a laydown area.

During normal operation, the lower cylindrical enclosure 106 also guides a flow of cooling air over the control rod drive mechanisms 112. This air flow is facilitated by apertures 106a which are formed about the base of this structure.

In summary, the arrangement of the invention improves over currently used arrangements by extending the cylindrical enclosure structure which surrounds the control element drive mechanisms (CEDMS) 112, upwardly to form a skirt portion 130 which extends above the missile shield 116, and which provides a space within which the cables 128 can be stored during periods of disconnection. This cylindrical enclosure extension or skirt 130 is, in accordance with the present invention, used in combination with hingedly mounted structures (i.e. window trays 138) which form an inboard half of a "drawbridge" arrangement. The cables 128 which, in this embodiment, are preferably flexible Mineral Insulated (MI) cable instead of the thicker heavier organic cables. These cables are smaller in diameter, bending radius and lighter in weight. The terminal panels 132 are also provided with hingedly mounted structures (i.e. window trays 140) which can be pivoted into position to compete the drawbridge arrangement and to guide the MI cables 128 to the appropriate connection sites on the terminal panels 132.

During refueling, the MI cables 128 are disconnected from the termination panels 132 and are either pushed from outside or are pulled from inside of the open space of the HACTS structure until the ends reach the lips of the window trays 138. The window trays 138, 140 in both structures are then lifted and locked in the place allowing room for a multiple stud tensioner to be lowered to a position wherein the studs which hold the pressure vessel head in place can be unscrewed.

There are several advantages to the improved design. The most important being that the whole lift rig together with the cable support structures can be removed in one lift during refueling. Also the cables will be disconnected only at the termination panels. This will reduce the time needed for disconnecting and reconnecting the cables as well as lifting the structure off and on the reactor.

As will be appreciated, the embodiment of the present invention has been disclosed as being an extension of the integral head lift rig and HACTS design. However, the present invention is not limited to this particular embodiment, and is, as will be fully appreciated by those skilled in the art to which the present invention pertains, applicable to any situation wherein hinged members can be selectively swung into position opposite one another to provide a drawbridge-like arrangement for the cables between HLRR/HACTS type of apparatus and terminal panels attached to the foundation steam generator walls or the like. The invention is not limited to window trays which are pivotal in the vertical direction, and can be used in a number of situations which will be readily apparent to those skilled in the art when acquainted with the above disclosure. The fact that no separate lift of the bridge cables is required and that a clearance for passage of the multiple stud tensioner or the like type of apparatus can be provided by this type of drawbridge arrangement, will be readily appreciated.

What is claimed is:

1. A cable support arrangement for a nuclear reactor system comprising:

a terminal panel supported on a wall of a cavity in which a pressure vessel of the nuclear reactor system is disposed;

a cylindrical housing disposed above the pressure vessel;

a first cable support tray pivotally mounted on the terminal panel, said first cable support tray being pivotal between an open position wherein it extends toward the cylindrical housing and spans a distance between the terminal panel and the cylindrical housing, and a closed folded position;

a second cable support tray pivotally mounted on the cylindrical housing, said second cable support tray being pivotal between an open position wherein it extends toward the terminal panel so as to span a distance between the terminal panel and the cylindrical housing, and a closed folded position wherein it lies essentially flush with the side of the cylindrical housing; and a plurality of cables which are housed within said cylindrical housing; said cables being arranged to remain connected at their respective first ends to predetermined devices which are associated with the pressure vessel and which are at least in part surrounded by said cylindrical housing, said cables being arranged to be drawn out of the cylindrical housing and extend across said first and second trays, which acts as a support arrangement between said housing and said terminal panel, and to be releasably connected to said terminal panel.

2. A cable support arrangement as set forth in claim 1, wherein said cylindrical housing comprises upper and lower portions and a missile shield disposed between the upper and lower portions, the lower portion enclosing control rod drive mechanism which are operatively mounted atop of a pressure vessel head which is connected to the top of the pressure vessel, the upper portion being adapted to receive said plurality of cables.

3. A cable support arrangement as set forth in claim 1, wherein said second cable support tray has limit means at a free edge thereof for engaging the respective second ends of said plurality of cables when they are disconnected from said terminal panel, and for holding the second ends in a position proximate a free edge of said second cable support tray to limit the maximum retractile movement of the cables into the interior of said cylindrical housing.

4. A method of refueling a nuclear reactor having a pressure vessel disposed in a reactor cavity, said pressure vessel having a pressure vessel head, comprising the steps of:

disconnecting cables from a terminal panel which is supported on a wall of the reactor cavity in which a nuclear reactor is disposed;

withdrawing the cables which are supported on first and second pivotal support members that are respectively pivotally supported on the terminal panel and an essentially cylindrically-shaped housing, and which extend toward each other, into the housing;

pivoting the first and second pivotal support members into folded positions wherein they lie essentially flush with the terminal panel and the housing respectively and wherein they open a gap between the terminal panel and the housing;

lowering a device through the gap to a head of the nuclear reactor and releasing the pressure vessel head from the pressure vessel; and lifting the pressure vessel head and the housing which are rigidly connected as a single unit, using a lifting device out of the cavity to expose an interior of the pressure vessel.

5. A method of connecting cables between a terminal panel and a housing comprising the steps of:

storing a plurality of cables in an essentially cylindrically-shaped enclosure;

pivoting a first cable support structure which is pivotally supported on a terminal panel disposed on a wall of cavity in which a nuclear reactor pressure vessel is disposed, from a first closed position to a second open position wherein it projects toward the cylindrically shaped enclosure;

pivoting a second cable support structure which is pivotally supported on a cylindrical enclosure structure from a first closed position to a second open position wherein it extends toward the terminal panel and wherein it opens an opening formed in the cylindrical enclosure;

drawing a plurality of cables which are housed in the housing and are connected at their respective first ends to predetermined devices, out of the opening and across the first and second cable support structures and connecting the ends of the cables to the terminal panel.

6. A drawbridge arrangement comprising:

a first pivotal support member hingedly supported on a housing in which a predetermined length of cable is disposed;

a second pivotal support member hingedly supported on a terminal panel which is supported on a wall portion of a structure in which the housing is disposed, the cable being guided over the first and second pivotal support members to said terminal panel; and means for pivoting the first and second pivotal support members to closed positions after the cable has been disconnected from the terminal panel and drawn back into the housing.

7. A drawbridge arrangement as set forth in claim 6, wherein the housing is cylindrical and is formed with a window aperture which is located adjacent said first pivotal support member in a manner wherein the said first pivotal support member closes the window aperture in the closed position and acts as a window tray in the open position.

8. A reactor system comprising:

means defining a cavity having a wall;

a pressure vessel disposed in said cavity, said pressure vessel having a pressure vessel head;

control rod means operatively disposed on said pressure vessel head for lowering control rods into said pressure vessel;

a lower cylindrical enclosure disposed about said control rod means, said lower cylindrical enclosure being connected to the pressure vessel head in a manner to be rigid herewith;

a missile shield disposed in and secured to an upper end of said lower cylindrical enclosure;

an upper cylindrical enclosure which is rigidly connected to at least one of said lower cylindrical enclosure and said missile shield;

a plurality of cables which are operatively connected at their respective first ends to said plurality of control rod means;

a terminal panel supported on a wall of said cavity at a location opposite said upper cylindrical enclosure;

a first pivotal member supported on said upper cylindrical enclosure adjacent an aperture formed in said upper cylindrical enclosure; and a second pivotal member supported on said terminal panel or on the wall of said cavity, the first and second pivotal members being each pivotal to an open positions wherein they extend toward each other and bridge a gap between said upper cylindrical enclosure and said terminal panel to create a drawbridge-like cable support structure that supports said plurality of cables when they are drawn out of the upper cylindrical enclosure and connected to said terminal panel.

* * * * *